United States Patent
Carney et al.

(10) Patent No.: US 9,100,432 B2
(45) Date of Patent: Aug. 4, 2015

(54) CLOUD-BASED DISTRIBUTED DENIAL OF SERVICE MITIGATION

(71) Applicant: Verizon Patent and Licensing, Inc., Basking Ridge, NJ (US)

(72) Inventors: Mark D. Carney, Sterling, VA (US); Dante J. Pacella, Charles Town, WV (US); Jeffrey A. Jackson, Coppell, TX (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 66 days.

(21) Appl. No.: 13/724,002

(22) Filed: Dec. 21, 2012

(65) Prior Publication Data

US 2014/0181966 A1   Jun. 26, 2014

(51) Int. Cl.
   *H04L 29/06* (2006.01)
(52) U.S. Cl.
   CPC ........ *H04L 63/1458* (2013.01); *H04L 63/1491* (2013.01)

(58) Field of Classification Search
   USPC .................................................... 726/22–24
   See application file for complete search history.

(56) References Cited

U.S. PATENT DOCUMENTS

| 2006/0075139 | A1* | 4/2006 | Jungck ........................ 709/245 |
| 2011/0270969 | A1* | 11/2011 | Noh et al. .................... 709/224 |

* cited by examiner

*Primary Examiner* — Ghazal Shehni (57) ABSTRACT

A method, performed by a computer device, may include receiving an indication of a distributed denial of service event at a front end system associated with a customer; generating one or more virtual front end systems for the customer, in response to receiving the indication of the distributed denial of service event; and redirecting traffic intended for the customer's front end system to the generated one or more virtual front end systems. The method may further include determining whether resource capacity of the generated one or more virtual front end systems has been reached; and generating an additional one or more virtual front end systems for the customer, in response to determining that the resource capacity of the generated one or more virtual front end systems has been reached.

20 Claims, 7 Drawing Sheets

CLOUD-BASED DISTRIBUTED DENIAL OF SERVICE MITIGATION

BACKGROUND INFORMATION

Computer devices and networks may become subject to events that disrupt the functionality of the devices or networks or that exhaust the resources of the devices or networks. One example of such an event is a distributed denial of service (DDOS) attack. In a DDOS attack, multiple computer systems may flood a target system, such as a server device, with requests or commands that attempt to exhaust the resources of the target system in order to make the resources unavailable to legitimate users. For example, a DDOS attack may consume computational resources, such as bandwidth, memory space, or processor time. A DDOS attack may be quite damaging to both the target system and the users of the target system.

DETAILED DESCRIPTION OF PREFERRED EMBODIMENTS

The following detailed description refers to the accompanying drawings. The same reference numbers in different drawings identify the same or similar elements.

An implementation described herein relates to cloud based distributed denial of service (DDOS) event mitigation. When a customer's front end system, such as the customer's web site, experiences a DDOS event, one or more virtual front end systems for the customer may be generated in a cloud center based on a profile configured for the customer. For example, a customer may configure an operating system and/or server software, and the one or more virtual front end systems may be generated based on the customer's configurations. Furthermore, the customer's front end software and/or content may be copied to the one or more virtual front end systems. The virtual front end systems may be implemented using an Infrastructure-as-a-service (IaaS) model, using a platform-as-a-service (PaaS) model, and/or using a software-as-a-service (SaaS) model. In some implementations, the virtual front end systems may be generated in response to a DDOS event. In other implementations, the virtual front end systems may be generated beforehand and may be activated upon a request from the customer. The virtual front end systems may be generated using full disk encryption.

Traffic intended for the customer's front end system may be redirected to the one or more virtual front end systems. For example, a Domain Name Server (DNS) entry associated with the customer's front end system may be configured to direct data traffic to the generated one or more virtual front end systems in the cloud center for the duration of the DDOS event. Furthermore, a routing instance, associated with the customer, in a cloud center access system may be configured to direct the data traffic to the generated one or more virtual front end systems. Thus, the data traffic may be handled by the generated virtual front end systems, rather than the customer's front end system. Furthermore, the customer may access the virtual front end systems and may configure and/or change the virtual front end systems as needed.

Traffic directed to the generated one or more virtual front end systems may be load balanced across the virtual front end systems. For example, if ten virtual front end systems are generated, each of the generated virtual front end systems may receive a tenth of the redirected traffic. Monitoring may be performed to determine whether the generated virtual front end systems are associated with sufficient resources to handle the redirected data traffic associated with the DDOS event. If the resources associated with the generated virtual front end systems are being exhausted, additional virtual front end systems may be generated as needed. When the DDOS event is determined to have ended, the generated virtual front end systems may be uninstalled and data traffic may be redirected to the customer's front end system.

A DDOS event, as the term is used herein, may refer to any event that exhausts, disrupts, or obstructs, or attempts to exhaust, disrupt, or obstruct, resources associated with a computer device or network. For example, a DDOS event may consume computational resources, such as bandwidth, memory, storage space, and/or processor time; may disrupt configuration information, such as routing information; may disrupt protocol state information, by, for example, resetting Transmission Control Protocol (TCP) sessions or leaving TCP connections open; may trigger previously identified errors in the software or firmware of a computer device or of an operating system; and/or may otherwise exhaust, disrupt, or obstruct computing resources.

A DDOS event may be intentional, as in the case of a DDOS attack, or unintentional. An example of an unintentional DDOS event, sometime referred to as the "Slashdot effect," may include a popular website posting a link to a less well known website, resulting in a large increase of traffic to the less well known website. Another example of an unintentional DDOS event may include a coding bug or error that results in the generation of multiple requests to a particular website, resulting in a large increase in traffic to the website.

Figure 1:
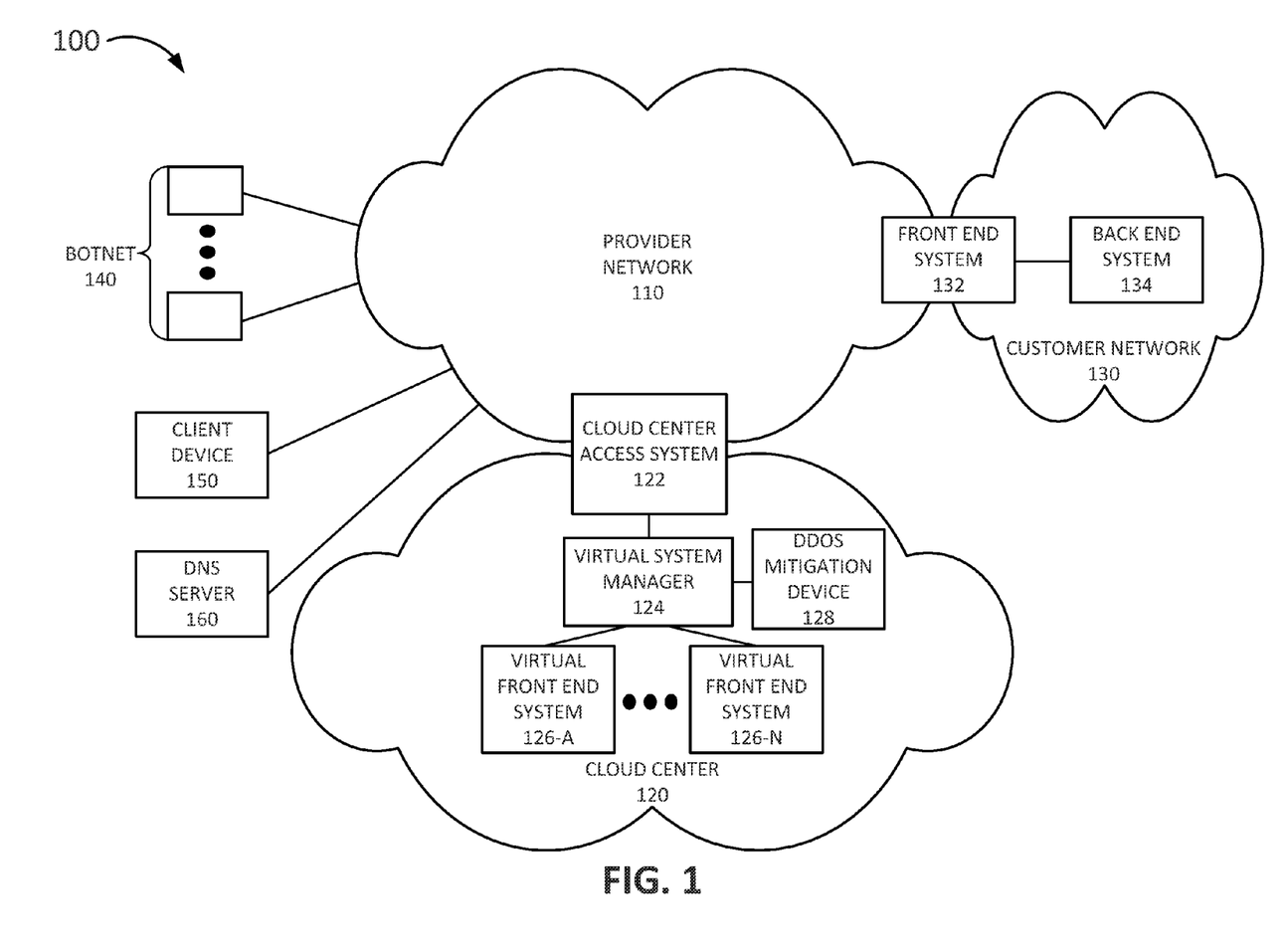
FIG. 1 is a diagram illustrating an exemplary environment according to an implementation described herein.

FIG. 1 is a diagram illustrating an exemplary environment 100 according to an implementation described herein. As shown in FIG. 1, environment 100 may include a provider network 110, a cloud center 120, a customer network 130, a botnet 140, a client device 150, and a Domain Name System (DNS) server 160. While a single cloud center 120, a single customer network 130, a single botnet 140, a single client device 150, and a single DNS server 160 are shown in FIG. 1 for illustrative purposes, in practice, environment 100 may include multiple cloud centers 120, multiple customer networks 130, multiple botnets 140, multiple client devices 150, and/or multiple DNS servers 160.

Provider network 110 may enable communication between cloud center 120, customer network 130, botnet 140, client device 150, and/or DNS server 160. Provider network 110 may include one or more wired and/or wireless networks. For example, provider network 110 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Additionally or alternatively, provider network 110 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network.

Cloud center 120 may include one or more server devices and/or storage devices, which provide cloud services for customers. Cloud services provided by cloud center 120 may include, for example, computing as a service, cloud storage, a hosted voice-over-Internet Protocol (VoIP) service, a Network Address Translation (NAT) service, a Virtual Private Network (VPN) service, a DDOS detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that be provided by a cloud center. Furthermore, cloud center 120 may provide cloud-based DDOS mitigation through generation of virtual front end systems for customers. Cloud center 120 may include a cloud center access system 122, a virtual system manager 124, one or more virtual front end systems 126-A to 126-N (referred to herein collectively as "virtual front end systems 126" and individually as "virtual front end system 126"), and a DDOS mitigation device 128.

Cloud center access system 122 may include one or more devices that connect cloud center 120 to provider network 110. Devices in cloud center 120 may connect to cloud center access system 122 with a Layer 2 connection or with a Layer 3 connection. For example, cloud center access system 122 may include one or more network devices that function as Layer 2 and/or Layer 3 devices and that maintain Layer 2 and/or Layer 3 separation for different customers. Layer 2 separation may correspond to maintaining Layer 2 traffic associated with a first customer separate from Layer 2 traffic associated with a second customer. Layer 2 separation may be accomplished by assigning particular Layer 2 Domains (L2D) to particular customers and tagging Layer 2 data units (e.g., Ethernet frames) with particular L2D tags. Layer 3 separation may correspond to maintaining Layer 3 traffic associated with a first customer separate from Layer 3 traffic associated with a second customer. Layer 3 separation may be accomplished by maintaining particular routing instances for particular customers. Each routing instance may include a separate routing table and traffic associated with a particular customer may be routed based on the routing table associated with the customer's routing instance.

Virtual system manager 124 may include one or more devices, such as server devices, that generate virtual front end systems 126. For example, virtual system manager 124 may obtain specifications for a customer profile from a customer and use the obtained specifications to generate virtual front end systems 126 in response to a DDOS event being experienced by customer network 130. Virtual system manager 124 may redirect traffic destined for customer network 130 to the generated virtual front end systems 126 and may monitor the generated virtual front end systems 126 to determine whether resources associated with the generated virtual front end systems 126 are being exhausted. If the resources are being exhausted, virtual system manager 124 may generate additional virtual front end systems 126. Once the DDOS event is determined to have ended, virtual system manager 124 may redirect the traffic back to customer network 130.

Virtual front end system 126 may include one or more devices, such as server devices, which are configured by virtual system manager 124 to simulate a front end system associated with the customer. Each virtual front end system 126 may include an instance of the front end system and traffic to customer network 130 may be load balanced across the virtual front end system 126.

DDOS mitigation device 128 may perform DDOS mitigation on traffic directed to customer network 130. For example, DDOS mitigation device 128 may identify a signature associated with a DDOS event and may filter out traffic that includes the identified signature. For example, if traffic from a particular IP address is determined to include the identified signature, traffic from the particular IP address may be blocked.

Customer network 130 may include a private network associated with a particular customer. Customer network 130 may include a front end system 132 and a back end system 134. Front end system 132 may include one or more devices, such as server devices, which interface customer network 130 with provider network 110. Front end system 132 may be accessible via provider network 110 by botnet 140 and/or client device 150. For example, front end system 132 may include a web site accessible via provider network 110. As another example, front end system 132 may provide a particular service, such as an email service, a DNS service, a media streaming service, a voice over IP service, and/or another type of service to subscribers, users, and/or members of customer network 130. Back end system 134 may include one or more devices, such as server devices, which are not accessible via provider network 110 without authentication. Thus, a user may need to authenticate the user's identity using front end system 132 in order to access back end system 134. Thus, back end system 134 may not be directly subject to DDOS events. Mitigating a DDOS event at front end system 132 may prevent damage to back end system 134.

Botnet 140 may include a collection of computer devices that have been recruited or hijacked to take part in a DDOS attack on front end system 132 of customer network 130. For example, botnet 140 my include personal computers hijacked by way of being infected with malware that launches a DDOS attack on front end system 132 at a particular time.

Client device 150 may include any device capable of accessing front end system 132. For example, client device 150 may access a web page hosted by front end system 132 using a browser application (e.g., Microsoft Explorer, Mozilla Firefox, Google Chrome, Apple Safari, mobile versions thereof, etc.), a proxy service, a script, and/or any other application which enables client device 150 to communicate with front end system 132 using a particular protocol. Client device 150 may include a desktop computer, a server device, a laptop computer, a notebook computer, a mobile phone, a smart phone, a tablet computer, a personal digital assistant (PDA), or another type of computer device.

DNS server 160 may resolve queries for a domain name by returning an Internet Protocol (IP) address assigned to the domain name. DNS server 160 may be part of a distributed DNS network that maintains mappings of domain names to IP addresses. Thus, if a domain name is updated with a new IP address, the update may be distributed through the network of DNS servers 160. Client device 150 (and/or computers associated with botnet 140) may use a browser application to access a web page associated with a domain name. The browser application may contact DNS server 160 to request an IP address associated with the domain name. DNS server 160 may return the associated IP address and the browser application may use the associated IP address to request the web page.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
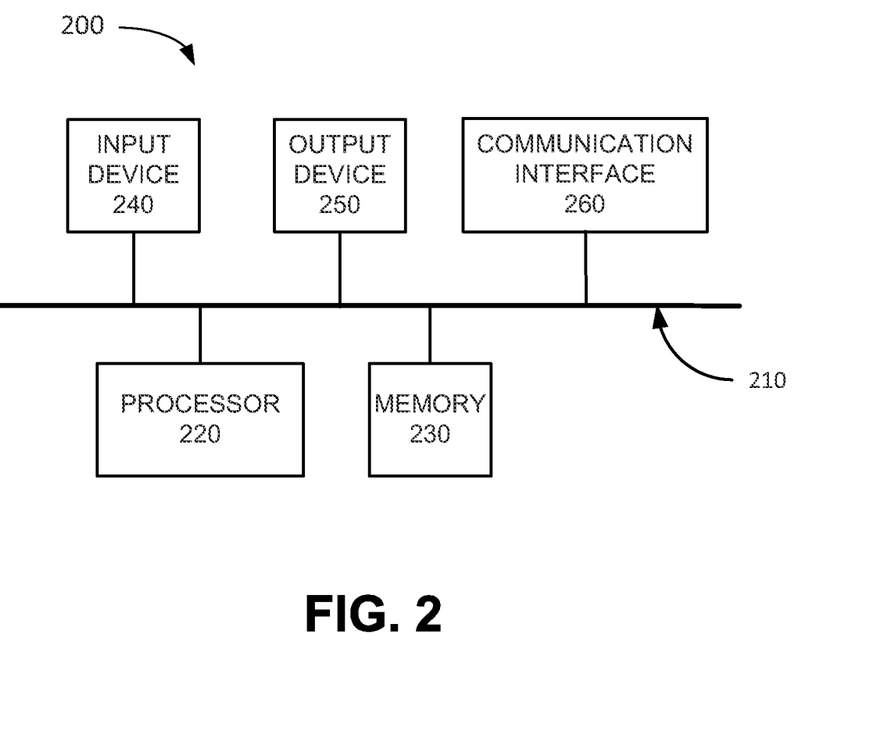
FIG. 2 is a diagram illustrating exemplary components of a device that may be included in one of the components of the environment of FIG. 1.

FIG. 2 is a diagram illustrating an exemplary device 200 that may be included in a component of the environment of FIG. 1 according to an implementation described herein. Cloud center access system 122, virtual system manager 124, virtual front end systems 126, DDOS mitigation device 128, front end system 132, back end system 134, client device 150, and/or DNS server 160 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to generation of virtual front end systems 126 for a customer and/or relating to DDOS mitigation. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
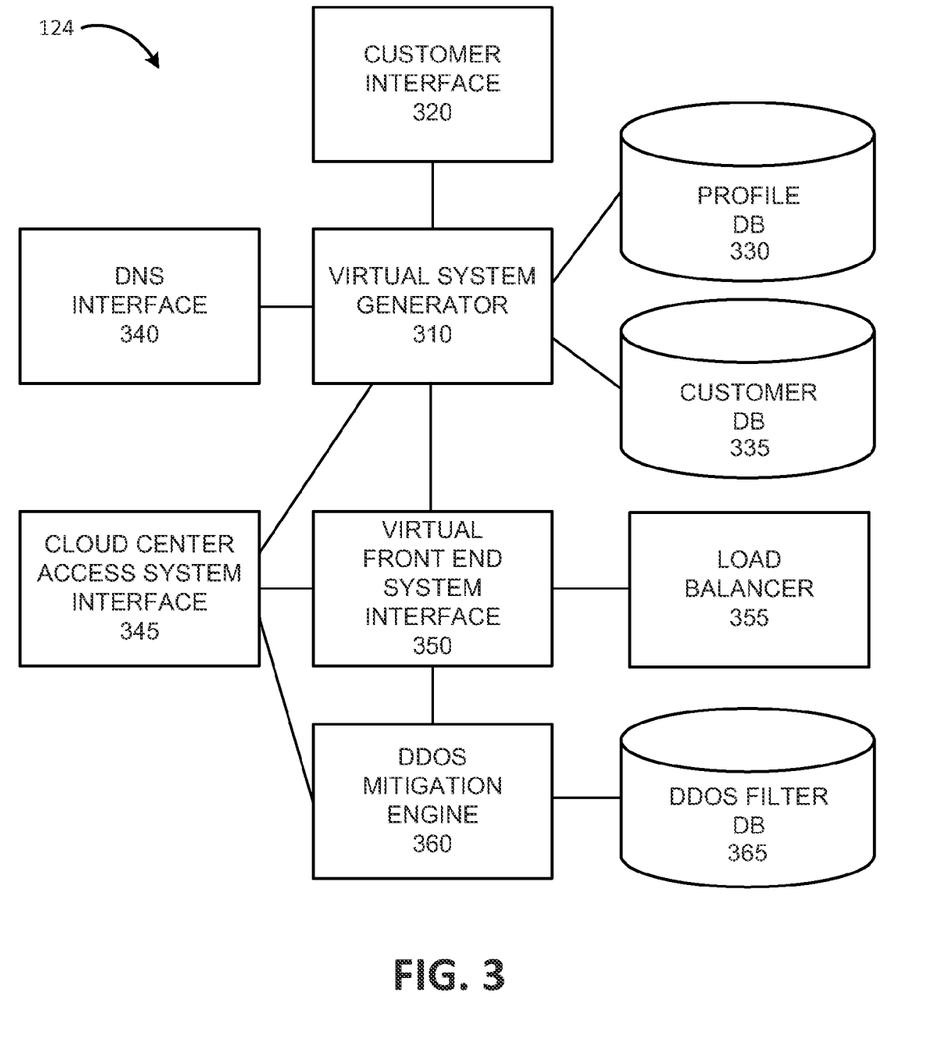
FIG. 3 is a diagram illustrating exemplary functional components of the virtual system manager of FIG. 1.

FIG. 3 is a diagram illustrating exemplary functional components of virtual system manager 124 according to an implementation described herein. The functional components of virtual system manager 124 may be implemented, for example, via processor 220 executing instructions from memory 230. Alternatively, some or all of the functional components of virtual system manager 124 may be implemented via hard-wired circuitry. As shown in FIG. 3, virtual system manager 124 may include a virtual system generator 310, a customer interface 320, a profile database (DB) 330, a customer DB 335, a DNS interface 340, a cloud center access system interface 345, a virtual front end system interface 350, a load balancer 355, a DDOS mitigation engine 360, and a DDOS filter DB 365.

Virtual system generator 310 may obtain configuration information and/or software and content relating to a front end system associated with a customer's front end system 132 and may store the information in customer DB 335. Virtual system generator 310 may use the obtained information to generate virtual front end systems 126 for the customer in response to a DDOS event. Alternatively, virtual system generator 310 may generate virtual front end systems 126 beforehand and virtual front end systems 126 may be activated at the customer's request. Virtual system generator 310 may generate additional virtual front end systems 126 as resources of the generated virtual front end systems 126 are exhausted.

Customer interface 320 may communicate with customer network 130 to obtain the configuration information. Furthermore, customer interface 320 may be used to manage a connection between back end system 134 and virtual front end systems 126. For example, the customer may use customer interface 320 to access virtual front end systems 126 to configure, update, and/or manage virtual front end systems 126.

Profile DB 330 may store information relating to particular profiles. Exemplary information that may be stored in profile DB 330 is described below with reference to FIG. 4A. Customer DB 335 may store information relating to particular customers. Exemplary information that may be stored in customer DB 335 is described below with reference to FIG. 4B.

DNS interface 340 may communicate with DNS server 160. For example, DNS interface 340 may send a domain name update, associated with front end system 132, to DNS server 160 to associate a new IP address with the domain name. Cloud center access system interface 345 may configure a routing instance, associated with the customer, in cloud center access system 122 to direct traffic to virtual system manager 124 and/or virtual front end systems 126 and may configure a connection between virtual front end systems 126 and back end system 134.

Virtual front end system interface 350 may communicate with server devices that are configured as virtual front end systems 126 or that are to be configured as virtual front end systems 126. For example, virtual front end system interface 350 may direct traffic between virtual front end systems 126 and botnet 140, client device 150, back end system 134, and/or other devices.

Load balancer 355 may monitor the resources associated with each of the virtual front end systems 126 and may distribute the traffic to balance the use of the resources for each of the virtual front end systems 126. Thus, for example, if one of the virtual front end systems 126 becomes overloaded (e.g., in terms of bandwidth, memory use, processor time, etc.), load balancer 355 may redirect a portion of the traffic to another virtual front end system 126.

DDOS mitigation engine 360 may perform DDOS mitigation on traffic associated with virtual front end systems 126. In some implementations, DDOS mitigation engine 360 may interface with DDOS mitigation device 128 to perform the DDOS mitigation. In other implementations, the DDOS mitigation may be performed by DDOS mitigation engine 360. For example, DDOS mitigation engine 360 may identify a signature associated with a DDOS event and may filter out traffic that includes the identified signature. DDOS filter DB 365 may store information relating to one or more DDOS filters associated with a DDOS event. For example, DDOS filter DB 365 may include elements that have been identified as being associated with a DDOS attack, such as IP addresses, Hypertext Transfer Protocol headers, Uniform Resource Identifiers, etc. Traffic identified as including elements stored in DDOS filter DB 365 may be blocked.

Although FIG. 3 shows exemplary functional components of virtual system manager 124, in other implementations, virtual system manager 124 may include fewer functional components, different functional components, differently arranged functional components, or additional functional components than depicted in FIG. 3. Additionally or alternatively, one or more functional components of virtual system manager 124 may perform functions described as being performed by one or more other functional components of virtual system manager 124.

Figure 4A:
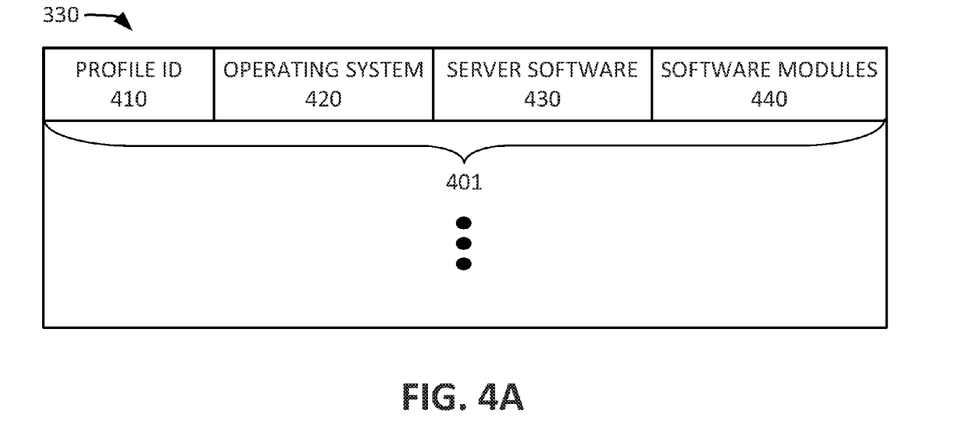
FIG. 4A is a diagram illustrating exemplary components of a profile database according to an implementation described herein.

FIG. 4A is a diagram illustrating exemplary components of profile DB 330. As shown in FIG. 4A, profile DB 330 may include one or more profile records 401 (referred to herein collectively as "profile records 401" and individually as "profile record 401"). Each profile record 401 may store information relating to a particular front end profile. Profile record 401 may include a profile identifier (ID) field 410, an operating system field 420, a server software field 430, and a software modules field 440.

Profile ID field 410 may include a profile ID identifying a particular profile. Operating system field 420 may include information identifying a particular operating system associated with the particular profile, such as, for example, Red Hat Linux, Scientific Linux, Ubuntu, Berkeley Software Distribution Linux, Solaris, Novell Netware, OS X, and/or another operating system. Operating system field 420 may further include information identifying a particular version of the particular operating system.

Server software field 430 may include information identifying a particular server software platform associated with the particular profile, such as, for example, Apache, Internet Information Services, nginx, Google Web Server, Squid, and/or another type of server software platform. Software modules field 440 may include information identifying particular server software modules associated with the particular profile. For example, if the server software platform corresponds to Apache server software, software modules field 440 may include information identifying the particular Apache modules associated with the particular profile.

Although FIG. 4A shows exemplary components of profile DB 330, in other implementations, profile DB 330 may include fewer components, different components, differently arranged components, or additional components than depicted in FIG. 4A.

Figure 4B:
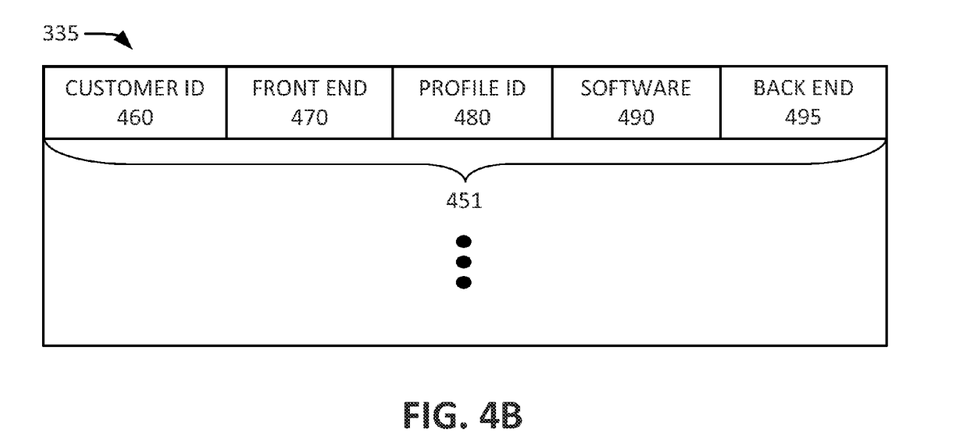
FIG. 4B is a diagram illustrating exemplary components of a customer database according to an implementation described herein.

FIG. 4B is a diagram illustrating exemplary components of customer DB 335. As shown in FIG. 4B, customer DB 335 may include one or more customer records 451 (referred to herein collectively as "customer records 451" and individually as "customer record 451"). Each customer record 451 may store information relating to a particular customer. Customer record 451 may include a customer ID field 460, a front end field 470, a profile ID field 480, a software field 490, and a back end field 495.

Customer ID field 460 may include a customer ID identifying a particular customer. Front end field 470 may include information identifying a particular front end system 132 associated with the particular customer. For example, front end field 470 may include a domain name and/or an IP address associated with the particular front end system 132.

Profile ID field 480 may include information identifying a particular profile ID associated with the particular customer. Software field 490 may include information identifying software and/or content associated with the particular customer. For example, software field 490 may include a pointer to software code that is running on front end system 132 associated with the particular customer, such as Hypertext Mark Up Language (HTML) code, Extensible Markup Language (XML) code, Javascript code, and/or other code that may run on front end system 132. Furthermore, software field 490 may include or identify content associated with front end system 132, such as text, images, audio files, video files, and/or other types of content. Back end field 495 may include information identifying a particular back end system 134 associated with the particular customer. For example, back end field 495 may include an IP address associated with the particular back end system 134.

Customer record 451 may exclude particular types of content, such as security certificates, public and/or private keys, passwords, and/or other types of security information. The customer may maintain the security information at back end system 134 and may provide the security information after the virtual front end systems 126 are generated over an established secure connection between back end system 134 and the generated virtual front end systems 126.

Although FIG. 4B shows exemplary components of customer DB 335, in other implementations, customer DB 335 may include fewer components, different components, differently arranged components, or additional components than depicted in FIG. 4B.

Figure 5:
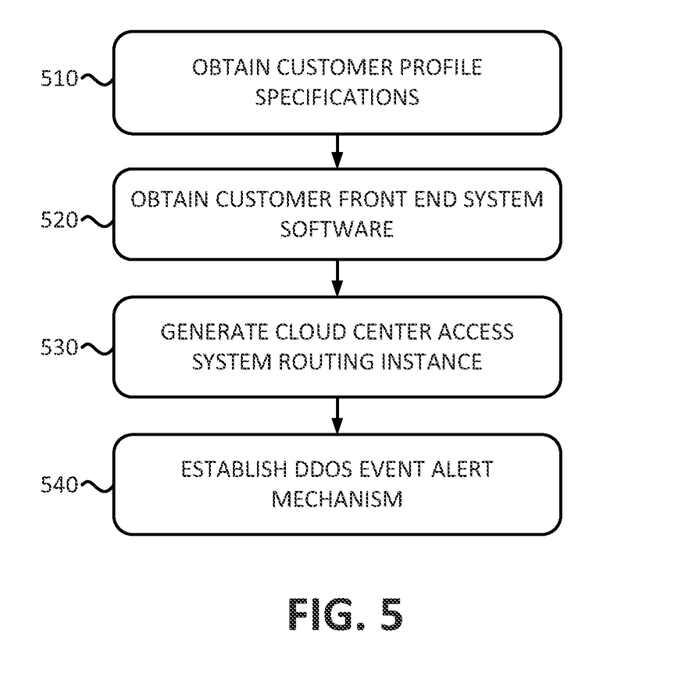
FIG. 5 is a flowchart of an exemplary process for configuring generation of a virtual front end system for a customer according to an implementation described herein.

FIG. 5 is a flowchart of an exemplary process for configuring generation of a virtual front end system for a customer according to an implementation described herein. In one implementation, the process of FIG. 5 may be performed by virtual system manager 124. In other implementations, some or all of the process of FIG. 5 may be performed by another device or a group of devices separate from virtual system manager 124 and/or including virtual system manager 124.

The process of FIG. 5 may include obtaining customer profile specifications (block 510). For example, virtual system generator 310 may generate a customer record 451 for a particular customer and may obtain profile information associated with the particular customer via customer interface 320, such as the operating system associated with front end system 132, server software associated with front end system 132, software modules associated with front end system 132, and/or other configuration information associated with front end system 132. The obtained information may be stored in the generated customer record 451.

Front end system software for the customer may be obtained (block 520). For example, virtual system generator 310 may obtain software running on front end system 132 associated with the particular customer and/or content included in front end system 132, and may include information associated with the obtained software, such as a pointer to a storage location where the software and/or content is stored, in the generated customer record 451.

A cloud center access system routing instance may be generated for the customer (block 530). For example, virtual system generator 310 may use cloud center access system interface 345 to generate a routing instance for the particular customer in cloud center access system 122. For example, the routing instance may be used to route traffic to virtual front end systems 126 and/or may be used to route traffic from virtual front end systems 126 to back end system 134. The routing instance may be activated in response to a DDOS event.

A DDOS event alert mechanism may be established (block 540). For example, customer interface 320 may be configured to receive an indication of a DDOS event from customer network 130. In some implementations, an indication of a DDOS event may be received from an administrator of customer network 130 along with a request to generate one or more virtual systems 126. In other implementations, virtual system manager 124 may use customer interface 320 to monitor resources associated with customer network 130 (e.g., bandwidth, memory, processor time) to determine whether the resources are in the process of being exhausted, and may detect a DDOS event in response to determining that the resources are in the process of being exhausted.

Figure 6:
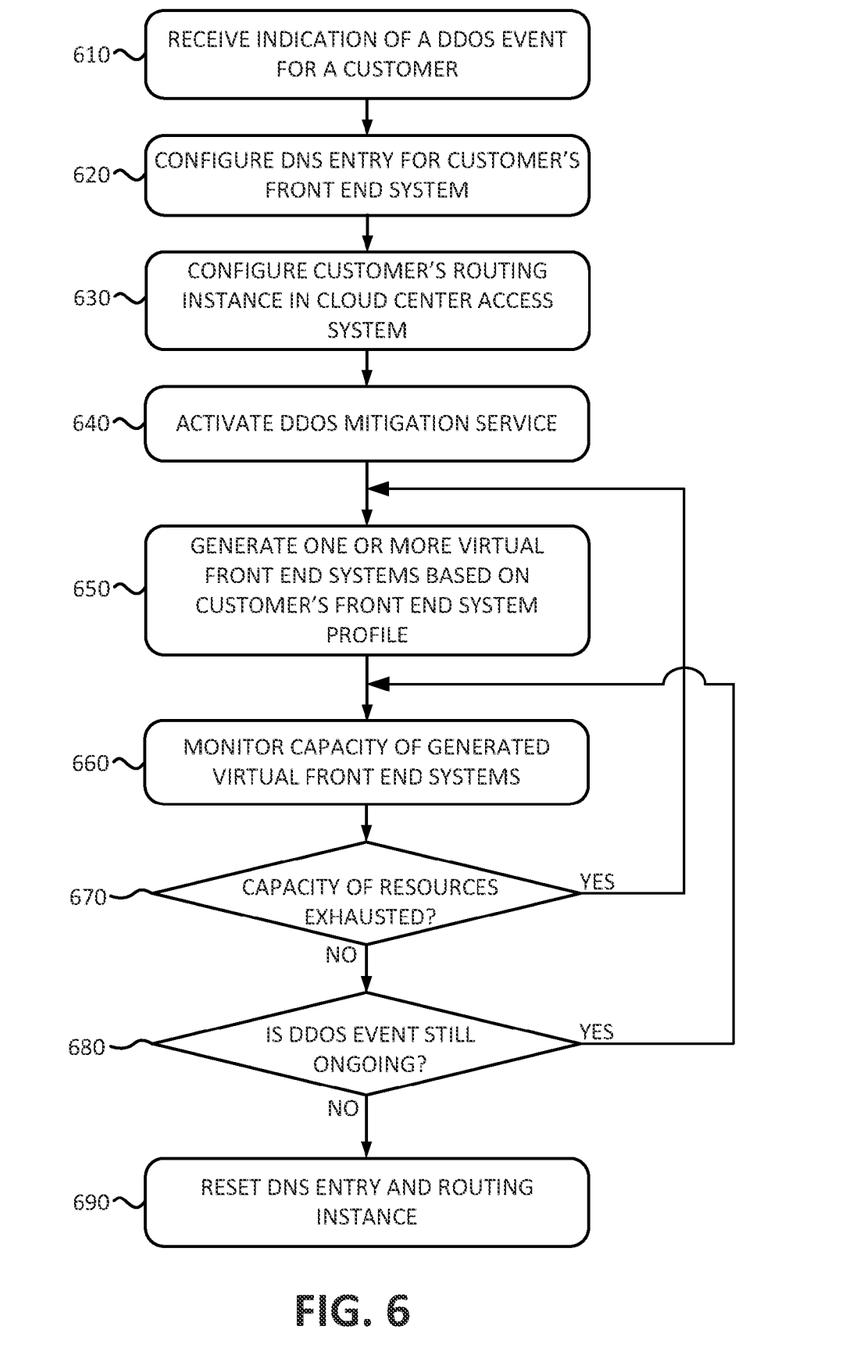
FIG. 6 is a flowchart of an exemplary process for generating virtual front end systems for a customer according to an implementation described herein.

FIG. 6 is a flowchart of an exemplary process generating virtual front end systems for a customer according to an implementation described herein. In one implementation, the process of FIG. 5 may be performed by virtual system manager 124. In other implementations, some or all of the process of FIG. 6 may be performed by another device or a group of devices separate from virtual system manager 124 and/or including virtual system manager 124.

The process of FIG. 6 may include receive an indication of a DDOS event for a customer (block 610). As an example, an indication of a DDOS event may be received from an administrator of customer network 130 along with a request to generate one or more virtual systems 126. As another example, virtual system manager 124 may detect that resources associated with front end system 132 are in the process of being exhausted, and may detect a DDOS event in response to determining that the resources are in the process of being exhausted. As yet another example, a customer may expect an upcoming DDOS attack based on, for example, threats published on the Internet or based on electronic intelligence collected by the customer and may request the generation of virtual front end systems 126 in anticipation of the upcoming DDOS event.

The customer may select a particular cloud computing model to use for the generation of virtual front end systems 126. As an example, the customer may select to use an IaaS model. In an IaaS model, server devices may be provided to the customer and virtual front end systems 126 may be run as guests by a hypervisor maintained by virtual system manager 124. Thus, the customer may be responsible for managing the operating systems and server software running on virtual front end systems 126.

As another example, the customer may select to use a PaaS model. In a PaaS model, a computing platform may be provided to the customer, including one or more of an operating system, a programming language environment, and/or server software. Thus, the customer may be responsible for managing application software running on virtual front end systems 126. As yet another example, the customer may select to use a SaaS model. In a SaaS model, application software may be provided for the customer and the customer may access the application software using a cloud client.

In some applications, a customer may select to offload only particular functions of front end system 132 to cloud center 120 during a DDOS event. Thus, virtual front end systems 126 may be generated to process the particular functions selected by the customer. For example, a customer may select to offload computationally intensive Secure Sockets Layer (SSL) encryption computations to cloud center 120 during a DDOS event. Thus, virtual front end systems 126 may function as SSL proxies. When virtual front end systems 126 function as SSL proxies, traffic coming to virtual front end systems 126 may be decrypted only long enough to place the traffic into another encrypted stream (e.g. session based SSL, Virtual Private Network (VPN) tunnel to the customer's server network, etc.) and no sensitive information may be retained by devices in cloud center 120. Virtual system manager 124 may configure customer record 451, associated with the customer, based on the selected configurations.

A DNS entry for the customer's front end system may be configured (block 620). For example, virtual system generator 310 may determine an IP address for a server device to be used for virtual front end systems 126 that will be generated and DNS interface 340 may update an entry, associated with front end system 132, in DNS server 160 with the determined IP address.

A customer's routing instance in a cloud center access system may be configured (block 630). For example, virtual system generator 310 may configure a routing instance, associated with the customer, to route traffic for the new IP address to virtual system manager 124 and/or to one or more server devices that will host the virtual front end systems 126. Cloud center access system interface 345 may update the routing table in cloud center access system 122 and cloud center access system 122 may propagate the information through provider network 110. For example, routing tables in network devices included in provider network 110 may be updated with the routing information.

Furthermore, the routing instance may reproduce a connection from front end system 132 to back end system 134. For example, if customer network 130 corresponds to a Layer 2 network, the routing instance may simulate a Layer 2 connection from any generated virtual front end system 126 to back end system 134. For example, cloud center access system 122 may generate a Virtual Private Network (VPN) tunnel between cloud center access system 122 and back end system 134, may generate a Multiprotocol Label Switching (MPLS) tunnel between cloud center access system 122 and back end system 134, and/or may create another type of secure connection between cloud center access system 122 and back end system 134. The secure connection may be used by the customer to access virtual front end systems 126 from back end system 134 when virtual front end systems 126 are generated and may enable the customer to configure and/or monitor the generated virtual front end systems 126.

A DDOS mitigation service may be activated (block 640). For example, virtual system generator 310 may activate DDOS mitigation engine 360 to start monitoring traffic to front end system 132 for patterns that may be used to filter out traffic associated with a DDOS event. One or more virtual front end systems may be generated based on the customer's front end system (block 650). For example, virtual system generator 310 may configure one or more server devices as virtual front end systems 126 based on information stored in customer record 451 and based on the profile associated with the customer in customer record 451. Virtual front end systems 126 may be generated with full disk encryption.

In some implementations, the virtual front end systems may be generated in response to a DDOS event. In other implementations, the virtual front end systems may be generated beforehand and may be activated upon a request from the customer. In some implementations, the number of virtual front end systems 126 that are generated may be selected by the customer. In other implementations, the number of virtual front end systems 126 that are generated may be determined based on the traffic load associated with the DDOS event. For example, if the traffic load associated with the DDOS event is within a first particular range of a particular measure (e.g., a particular number of TCP requests per second), virtual system manager 124 may generate a first number of virtual front end systems 126, and if the traffic load associated with the DDOS event is within a second particular range of the particular measure, virtual system manager 124 may generate a second number of virtual front end systems 126.

Traffic to the generated virtual front end systems 126 may be distributed by load balancer 355. As an example, if X virtual front end systems 126 were generated, each virtual front end system 126 may receive 1/X of the traffic. As another example, load balancer 355 may monitor the resources associated with each of the virtual front end systems 126 and may distribute the traffic to balance out the use of the resources for each of the virtual front end systems 126. Thus, for example, if one of the virtual front end systems 126 becomes overloaded (e.g., in terms of bandwidth, memory use, processor time, etc.), load balancer 355 may redirect traffic to another virtual front end system 126.

Furthermore, in some implementations, the virtual front end systems 126 may be generated in multiple cloud centers 120. If virtual front end systems 126 are generated in multiple cloud centers 120, load balancing may be performed across multiple cloud centers 120. For example, multiple cloud center access systems 122, associated with the different cloud centers 120, may be configured to load balance traffic across the different cloud centers 120. In some implementations, the multiple cloud center access systems 122 may be multi-homed with respect to one or more network devices in provider network 110. In other implementations, the multiple cloud center access systems 122 may communicate over a Layer 2 connection via a unified switching fabric. The routing instances associated with the customer may be implemented in the multiple cloud center access systems 122 and may be configured to load balance the traffic to virtual front end systems 126 using the connection infrastructure between the multiple cloud center access systems 122.

The capacity of the generated one or more virtual front end systems may be monitored (block 660). For example, virtual system generator 310, load balancer 355, and/or another component of virtual system manager 124 may monitor the resources associated with the generated virtual front end systems 126, such as the available bandwidth, the available memory, the processor computing time, and/or another measure of computing resources capacity.

The monitoring may include keeping track of the resources used by the generated virtual front end systems 126, such as the bandwidth used, the number of processor compute cycles used, and/or using another measure of the amount of resources used. The amount of used resources may be used to bill the customer for the use of the resources of cloud center 120. Furthermore, the monitoring may include the maintenance of logs of the processing performed by the generated virtual front end systems 126. The customer may be able to download the logs in order to perform analysis, such as Intrusion Detection System (IDS) analysis.

A determination may be made as to whether the capacity of the resources has been exhausted (block 670). For example, virtual system generator 310 may determine whether the monitored capacity of the resources of the generated one or more virtual front end systems 126 has been exhausted or is approaching exhaustion (e.g., is within a particular percentage of being exhausted). If the capacity has been exhausted or is approaching exhaustion (block 670—YES), processing may return to block 650 to generate additional one or more virtual front end systems 126. For example, virtual system manager 124 may generate additional virtual front end systems 126 to secure additional capacity to handle the DDOS event.

If the capacity has not been exhausted and is not approaching exhaustion (block 670—NO), a determination may be made as to whether the DDOS event is still ongoing (block 680). For example, virtual system generator 310, load balancer 355, or another component of virtual system manager 124 may determine that the traffic received by virtual front end systems 126 has dropped below a particular threshold or has been reduced by a particular amount over a particular period of time.

If the DDOS event is still ongoing (block 680—YES), processing may return to block 660 to continue to monitor the capacity of the generated virtual front end systems. If the DDOS event is not still ongoing (block 680—NO), the DNS entry and the routing instance may be reset (block 690). For example, virtual system generator 310 may reset the DNS entry associated with the customer to front end system 132 and may reset the routing instance in cloud center access system 122 to cease routing traffic to virtual system manager 124 and/or virtual front end systems 126. The routing information in the routing instance may be propagated to other network devices in provider network 110.

Figure 7:
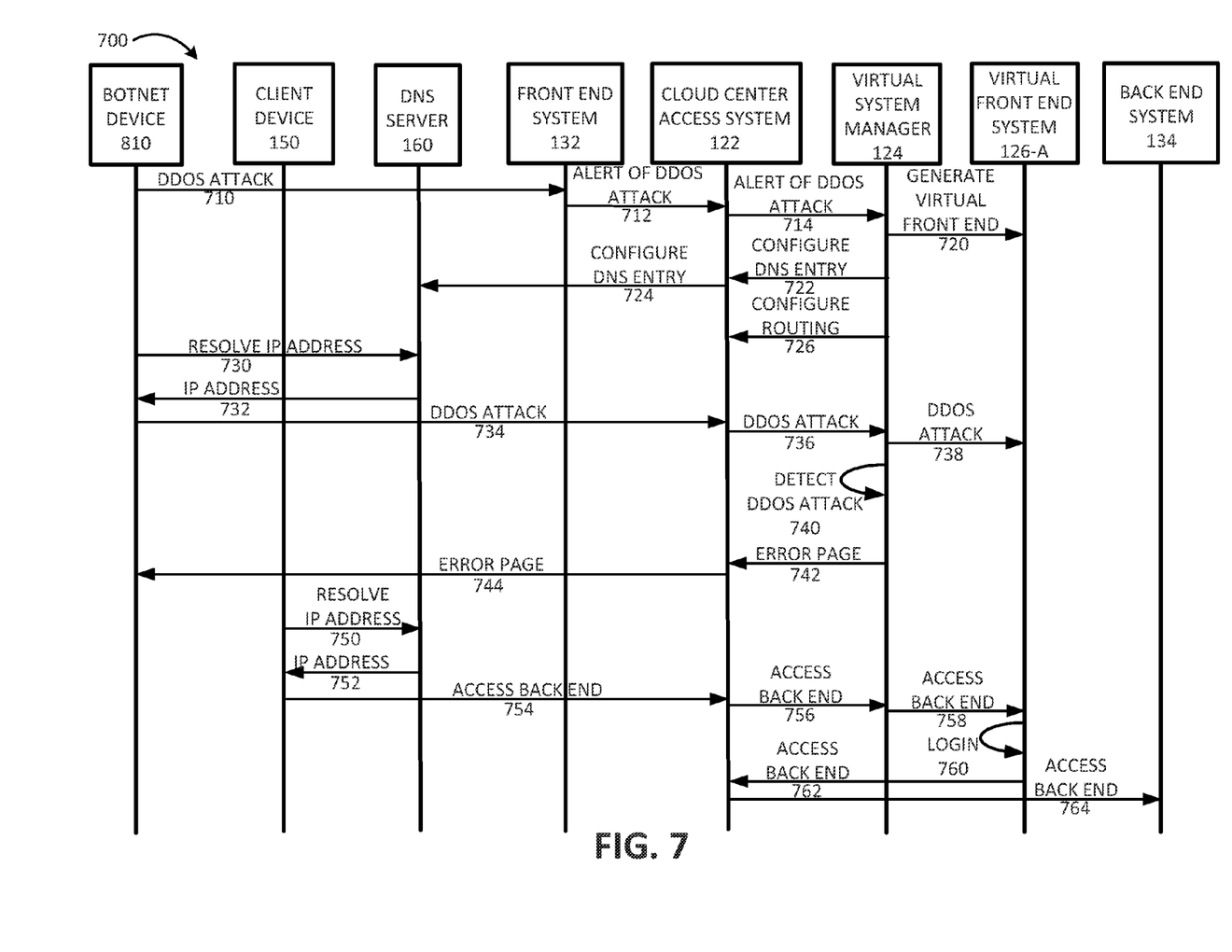
FIG. 7 is a first exemplary signal flow for generating a virtual front end system for a customer according to an implementation described herein.

FIG. 7 is a first exemplary signal flow 700 for generating a virtual front end system for a customer according to an implementation described herein. As shown in FIG. 7, signal flow 700 may include one or more botnet devices 810, which are part of botnet 140 and have initiated a DDOS attack on front end system 132 (signal 710). In response to the DDOS attack, front end system 132 may alert virtual system manager 124 of the DDOS attack via cloud center access system 122 (signals 712 and 714).

In response to receiving the DDOS attack alert, virtual system manager 124 may generate virtual front end system 126-A based on information stored in customer record 451 associated with front end system 132 (signal 720). For example, virtual system manager 124 may configure a server device with an operating system and server software associated with the profile identified in customer record 451 and may install customer software on the server device. Alternatively, virtual system manager 124 may activate a server device that has been configured based on the profile associated with the customer.

Furthermore, virtual system manager 124 may configure a DNS entry associated with front end system 132 to redirect traffic to virtual front end system 126 by changing an IP address associated with the domain name of front end system 132 to the IP address of virtual front end system 126 (signals 722 and 724). Furthermore, virtual system manager 124 may configure a routing instance associated with the customer in cloud center access system 122 to route traffic to virtual front end system 126-A and to route traffic destined for back end system 134 from virtual front end system 126-A to back end system 134 (signal 726).

Botnet device 810 may continue with the DDOS attack and may send a request to front end system 132. The domain name associated with front end system 132 may be resolved by DNS server 160 to the new IP address associated with virtual front end system 126-A (signals 730 and 732). Thus, botnet device 810 may send the requests associated with the DDOS attack to virtual front end system 126-A via cloud center access system 122 and virtual system manager 124 (signals 734, 736, and 738). Furthermore, DDOS mitigation engine 360 may perform DDOS mitigation by detecting a large number of requests from botnet device 810, may add botnet device 810 to a list of offenders, and may block further traffic from botnet device 810. DDOS mitigation engine 360 may send an error page to botnet device 810, which may deceive a user of botnet device 810 into believing that the DDOS attack is succeeding (signals 742 and 744).

Since the DDOS attack traffic may be load balanced across multiple virtual front end systems 126, virtual front end systems 126 may be able to handle all the received traffic. Thus, a legitimate user, associated with client device 150, may continue to be able to access front end system 132. For example, client device 150 may resolve a domain name associated with front end system 132 to the IP address of virtual front end system 126-A (signals 750 and 752) and may send a request for a login web page, in order to be authenticated and access back end 134, to virtual front end system 126-A (signals 754, 756, and 758). The user of client device 150 may then login using virtual front end system 126-A to gain access to back end system 134. The user may gain access to back end system 134 via the routing instance in cloud center access system 122 (signals 762 and 764).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As another example, while series of blocks have been described with respect to FIGS. 5 and 6, and signals with respect to FIG. 7, the order of the blocks and/or signals may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A method, performed by a computer device, the method comprising:

receiving, by the computer device, an indication of a distributed denial of service event at a front end system associated with a customer;

generating, by the computer device, one or more virtual front end systems for the customer, in response to receiving the indication of the distributed denial of service event;

configuring, by the computer device, the generated one or more virtual front end systems to include front end content from the front end system associated with the customer;

redirecting, by the computer device, traffic intended for the customer's front end system to the generated one or more virtual front end systems, in response to generating the one or more virtual front end systems;

determining, by the computer device, whether resource capacity of the generated one or more virtual front end systems has been reached; and generating, by the computer device, an additional one or more virtual front end systems for the customer, in response to determining that the resource capacity of the generated one or more virtual front end systems has been reached.

2. The method of claim 1, further comprising:
obtaining profile information for the customer, wherein the profile information includes at least one of:
operating system specifications associated with the front end system;
server software specifications associated with the front end system; or
customer software specifications associated with the front end system.

3. The method of claim 2, wherein configuring the generated one or more virtual front end systems, to include front end content from the front end system associated with the customer, includes at least one of:
generating an instance of an operating system based on the obtained operating system specifications;
installing server software based on the obtained server software specifications; or
installing customer software based on the obtained customer software specifications.

4. The method of claim 1, wherein redirecting traffic intended for the customer's front end system to the generated one or more virtual front end systems includes:
configuring a Domain Name server entry, associated with the front end system, to include an address associated with the generated one or more virtual front end systems.

5. The method of claim 1, wherein redirecting traffic intended for the customer's front end system to the generated one or more virtual front end systems includes:
configuring a routing instance, associated with the customer, in a cloud center access system to route the traffic to the generated one or more virtual front end systems.

6. The method of claim 1, further comprising:
performing distributed denial of service mitigation on the redirected traffic.

7. The method of claim 6, wherein performing the distributed denial of service mitigation includes:
identifying an Internet Protocol address, associated with the redirected traffic, as being associated with the distributed denial of service event;
filtering out traffic originating from the identified Internet Protocol address; and
sending an error page to the identified Internet Protocol address.

8. The method of claim 1, wherein redirecting traffic intended for the customer's front end system to the generated one or more virtual front end systems includes:
load balancing the redirected traffic across the generated one or more virtual front end systems.

9. The method of claim 8, wherein the generated one or more virtual front end systems are located in multiple cloud centers, and wherein load balancing the redirected traffic across the generated one or more virtual front end systems includes:
load balancing the redirected traffic across the generated one or more virtual front end systems across the multiple cloud centers.

10. The method of claim 1, further comprising:
establishing a connection from the generated one or more virtual front end systems to a back end system associated with the customer.

11. A computer device comprising:
logic configured to:
receive an indication of a distributed denial of service event at a front end system associated with a customer;
generate one or more virtual front end systems for the customer, in response to receiving the indication of the distributed denial of service event;
configure the generated one or more virtual front end systems to include front end content from the front end system associated with the customer;
redirect traffic intended for the customer's front end system to the generated one or more virtual front end systems, in response to generating the one or more virtual front end systems;
determine whether resource capacity of the generated one or more virtual front end systems has been reached; and
generate an additional one or more virtual front end systems for the customer, in response to determining that the resource capacity of the generated one or more virtual front end systems has been reached.

12. The computer device of claim 11, wherein the logic is further configured to:
obtain profile information for the customer, wherein the profile information includes at least one of:
operating system specifications associated with the front end system;
server software specifications associated with the front end system; or
customer software specifications associated with the front end system.

13. The computer device of claim 12, wherein, when the logic is configured to configure the generated one or more virtual front end systems to include front end content from the front end system associated with the customer, the logic is further configured to:
generate an instance of an operating system based on the obtained operating system specifications;
install server software based on the obtained server software specifications; and
install customer software based on the obtained customer software specifications.

14. The computer device of claim 11, wherein, when the logic is configured to redirect traffic intended for the customer's front end system to the generated one or more virtual front end systems, the logic is further configured to:
configure a Domain Name server entry, associated with the front end system, to include an address associated with the generated one or more virtual front end systems.

15. The computer device of claim 11, wherein, when the logic is configured to redirect traffic intended for the customer's front end system to the generated one or more virtual front end systems, the logic is further configured to:
configure a routing instance, associated with the customer, in a cloud center access system to route the traffic to the generated one or more virtual front end systems.

16. The computer device of claim 11, wherein the logic is further configured to:
perform distributed denial of service mitigation on the redirected traffic.

17. The computer device of claim 11, wherein, when the logic is configured to redirect traffic intended for the custom er's front end system to the generated one or more virtual front end systems, the logic is further configured to:
  load balance the redirected traffic across the generated one or more virtual front end systems.

18. A non-transitory computer-readable medium, storing instructions executable by one or more processors, the non-transitory computer-readable medium comprising:
  one or more instructions to receive an indication of a distributed denial of service event at a front end system associated with a customer;
  one or more instructions to generate one or more virtual front end systems for the customer, in response to receiving the indication of the distributed denial of service event;
  one or more instructions to configure the generated one or more virtual front end systems to include front end content from the front end system associated with the customer;
  one or more instructions to redirect traffic intended for the customer's front end system to the generated one or more virtual front end systems, in response to generating the one or more virtual front end systems;
  one or more instructions to determine whether resource capacity of the generated one or more virtual front end systems has been reached; and
  one or more instructions to generate an additional one or more virtual front end systems for the customer, in response to determining that the resource capacity of the generated one or more virtual front end systems has been reached.

19. The non-transitory computer-readable medium of claim 18, wherein the one or more instructions to configure the generated one or more virtual front end systems to include front end content from the front end system associated with the customer further include:
  one or more instructions to generate an instance of an operating system based on operating system specifications obtained from the customer;
  one or more instructions to install server software based on server software specifications obtained from the customer; and
  one or more instructions to install customer software based on customer software specifications obtained from the customer.

20. The non-transitory computer-readable medium of claim 18, wherein the one or more instructions to redirect traffic for the customer's front end system to the generated one or more virtual front end systems include:
  one or more instructions to configure a Domain Name server entry, associated with the front end system, to include an address associated with the generated one or more virtual front end systems; and
  one or more instructions to configure a routing instance, associated with the customer, in a cloud center access system to route the traffic to the generated one or more virtual front end systems.

* * * * *